United States Patent [19]

Giljam et al.

[11] Patent Number: 5,053,091
[45] Date of Patent: Oct. 1, 1991

[54] METHOD AND APPARATUS FOR MANUFACTURING PLASTIC FILM WITH INTEGRAL INTERLOCKING CLOSURE MEMBERS INCORPORATING SHAPE CONFORMING COOLING SHOES AFTER EXTRUSION

[75] Inventors: Kenneth J. Giljam, Nashville; David C. Huseman, Brentwood, both of Tenn.

[73] Assignee: Packaging Innovations, Inc., Nashville, Tenn.

[21] Appl. No.: 467,144

[22] Filed: Jan. 18, 1990

[51] Int. Cl.5 .............................................. B29C 47/88
[52] U.S. Cl. ...................................... 156/66; 156/80; 156/244.25; 156/498; 156/244.24; 264/237; 383/63
[58] Field of Search ............ 156/66, 80, 244.25, 156/498, 195, 244.24; 264/237, 177.19; 383/63; 425/378.1

[56] References Cited

U.S. PATENT DOCUMENTS

| | | | |
|---|---|---|---|
| Re. 29,208 | 5/1977 | Naito .................... | 156/498 X |
| 3,198,228 | 8/1965 | Naito . | |
| 3,291,177 | 12/1966 | Naito . | |
| 3,338,284 | 8/1967 | Ausnit . | |
| 3,804,567 | 4/1974 | Recknagel ............. | 425/378.1 X |
| 3,852,386 | 12/1974 | Behr ...................... | 264/237 X |
| 3,914,147 | 10/1975 | Weinand et al. ....... | 156/429 X |
| 3,945,872 | 3/1976 | Noguchi ................ | 156/498 X |
| 4,100,243 | 7/1978 | Wissinger et al. ..... | 264/177.19 X |
| 4,120,926 | 10/1978 | Titz ....................... | 264/177.19 X |
| 4,263,079 | 4/1981 | Sutrina et al. ......... | 156/66 X |
| 4,306,924 | 12/1981 | Kamp .................... | 156/66 |
| 4,363,345 | 12/1982 | Schelbner . | |
| 4,540,537 | 9/1985 | Kamp .................... | 156/66 X |
| 4,672,723 | 6/1987 | Hughes et al. ......... | 383/63 X |
| 4,676,851 | 6/1987 | Scheibner et al. ..... | 156/66 |
| 4,698,118 | 10/1987 | Takahashi .............. | 156/66 X |
| 4,701,361 | 10/1987 | Van Erden ............. | 156/66 X |
| 4,741,789 | 5/1988 | Zieke et al. ............ | 156/66 |
| 4,755,248 | 7/1988 | Geiger et al. .......... | 156/244.25 |
| 4,764,977 | 8/1988 | Wagers .................. | 383/63 |
| 4,842,907 | 6/1989 | VanErden .............. | 156/66 X |

FOREIGN PATENT DOCUMENTS 0020071 2/1979 Japan ........................... 264/177.19

Primary Examiner—Michael W. Ball
Assistant Examiner—Mark A. Osele
Attorney, Agent, or Firm—George Pappas

[57] ABSTRACT

A method and apparatus for use in extruding a plastic film with integral interlocking closure members. A flat plastic film and integral closure members are extruded through a single die opening. An air knife is used to push the extruded plastic film towards a chill roll and aids in the cooling of the film. The chill roll is rotatably driven and substantially cools the flat portion of the plastic film. Nozzles direct chilled air at the closure members. Cooling shoes are placed in close proximity to the extruded closure member and cool down and solidify the closure members. The cooling shoes are also used for shaping the closure members. The cooling shoes may be located adjacent the chill roll or adjacent a backing plate.

34 Claims, 3 Drawing Sheets

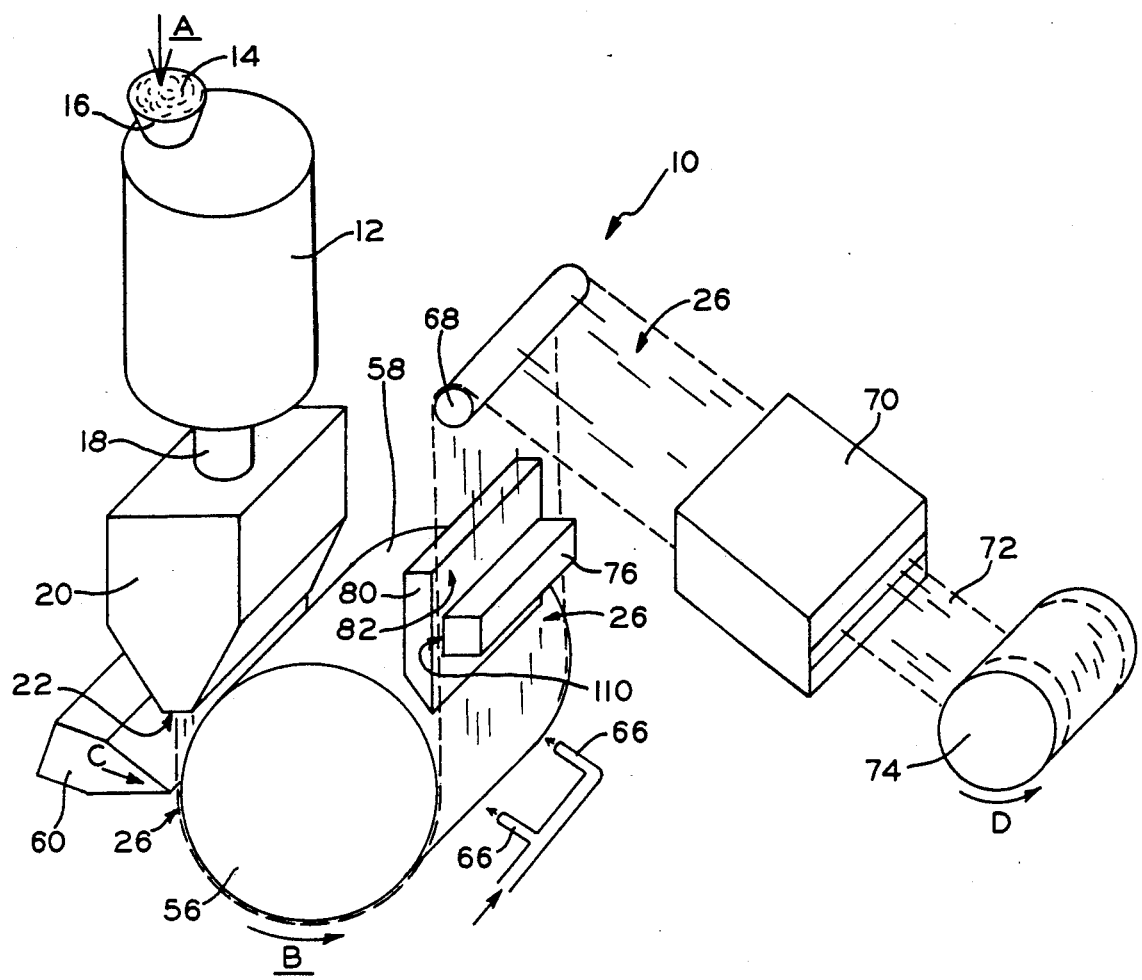
FIG_1
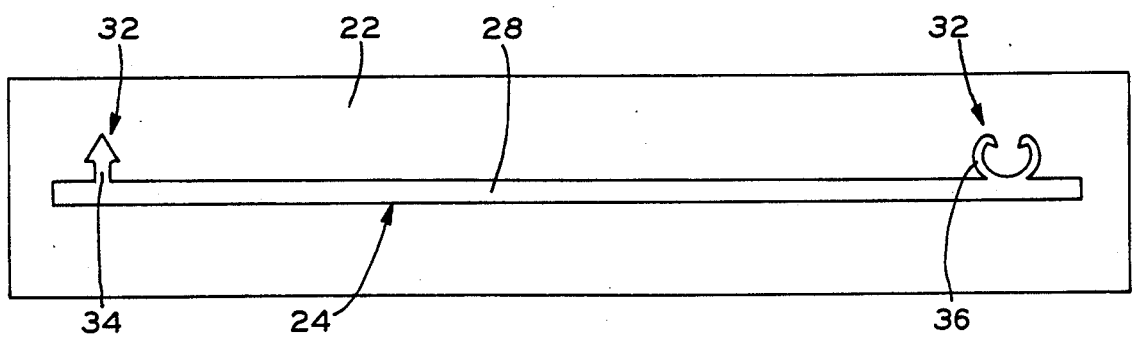
FIG_3

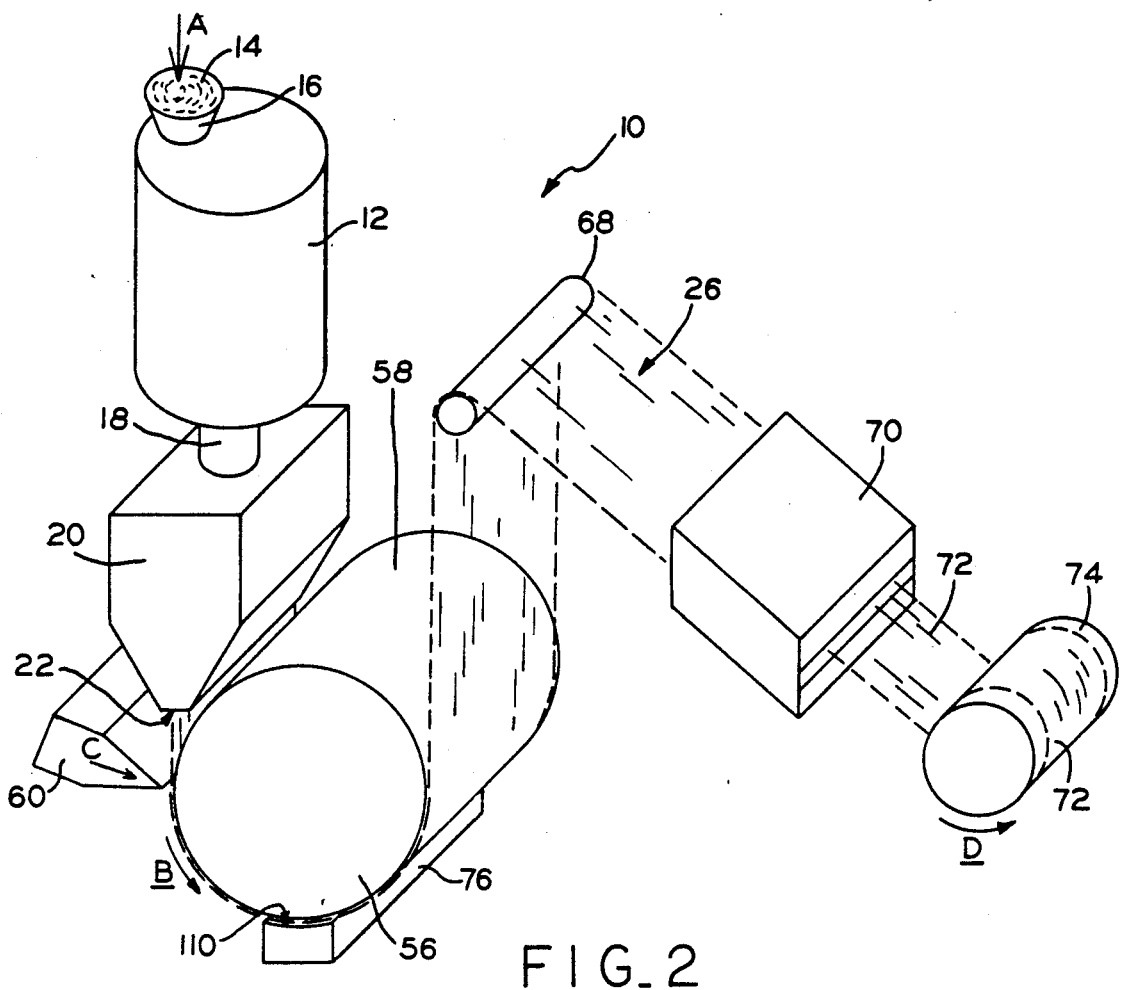
FIG_2
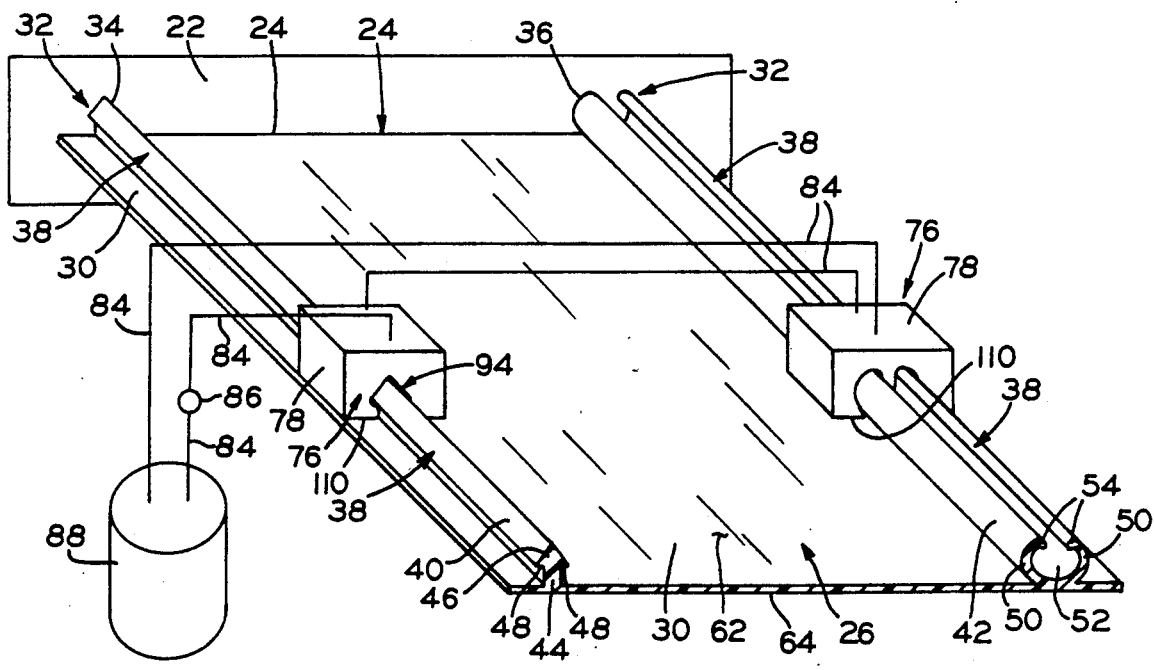
FIG_4

METHOD AND APPARATUS FOR MANUFACTURING PLASTIC FILM WITH INTEGRAL INTERLOCKING CLOSURE MEMBERS INCORPORATING SHAPE CONFORMING COOLING SHOES AFTER EXTRUSION

TECHNICAL FIELD

The present invention relates to the technical field of extruding thin plastic film and closure profiles used in the manufacture of reclosable bags. More specifically, the present invention relates to a method and apparatus for manufacturing the plastic film and the correspondingly interlocking closure profiles or members for use in forming reclosable bags.

BACKGROUND OF THE INVENTION

Reclosable plastic bags are presently commonly used for containing and storing various items ranging from edible and liquid products to clothing and hardware components. In general, the reclosable bags are formed of two sheets of plastic film sealed to one another at three sides thereof thereby forming a pocket between the sheets and an opening leading to within the pocket. At the opening, there are provided interlocking closure members, also known as zipper profiles. More specifically, at the opening of the bag, on one of the plastic sheets, there is provided a female or groove-type closure member and, on the other plastic sheet, there is provided a male or rib-type closure member. The groove and rib closure members are located generally opposite one another and the rib closure member is adapted to be received within the female groove member. The male and female closure members are adapted to interlock with one another and remain in that interlocked position until separated from one another with a given preselected force.

A common prior method of manufacturing the plastic film and closure members has been through what is known as the blown film process. In this process, a tube ultimately forming the plastic reclosable bag walls is extruded through an annular die while, simultaneously, air is being blown to within the tube so as to retain the shape of the tube until the plastic film solidifies. Air is blown onto the outside surface of the tube and, this air may also be chilled for aiding in the solidification of the plastic film. The annular dies are provided with integral closure member channels and, thus, the closure members are formed integrally with the plastic film in a single extrusion operation. The closure members are formed on the inner surface of the tube and, at the end of the cooling operation, the tube is collapsed and the male and female closure members caused to interlock. For example, the blown film process is disclosed in U.S. Pat. No. 3,291,177 issued to K. Naito; U.S. Pat. No. 3,852,386 ssued to R. D. Behr; and, U.S. Pat. No. 4,701,361 issued to D. L. Van Erden.

Another method of manufacturing the plastic film and closure members is known as the cast film process. In this process the plastic film and closure members are extruded separately and, thereafter, are joined together. In some such methods of manufacture, after having separately formed the closure members and the plastic film, the closure members and film are fused together with an adhesive or by reheating the contact area between the closure members and plastic film. In other cases, for example as shown in U.S. Pat. No. 4,764,977 issued to K. J. Wagers, the closure members are applied to the plastic film immediately after the closure members are extruded so that the retained heat of the closure members may, in effect, be used to cause the closure members to adhere to the plastic film. In yet another cast method as, for example, shown in U.S. Pat. No. 4,358,334 issued to T. A. Sutrina et al., the closure members are extruded immediately after the extrusion of the plastic film thereby using the retained heat of both the plastic film and closure members for joining the two together.

While the prior methods of manufacturing plastic film with closure members produce commercially acceptable product for reclosable bags, they have substantial drawbacks and shortcomings. The blown film process is undesirable in that only a relatively small number of profiles can be extruded with the plastic film from any single annular die opening and the overall extrusion rate and the speed of the extruded tube is substantially slow. The prior cast film processes also have substantial shortcomings and drawbacks in that two sets of extrusion dies or a two-step process is required in first forming the film and, thereafter, attaching the closure member thereto. Further yet, prior methods and apparatuses have drawbacks and shortcomings in the means by which the closure members are cooled after extrusion and, therefore, the closure members are quite often generally deformed. This is especially true where larger size closure members are required. Accordingly, a need exists for a method and apparatus for manufacturing a plastic film and relatively high quality closure members in a substantially fast method.

SUMMARY OF THE INVENTION

It is the principal object of the present invention to overcome the above-discussed disadvantages and drawbacks associated with prior methods and apparatuses for manufacturing plastic film and closure members for reclosable bags.

The present invention overcomes the disadvantages and drawbacks of the prior methods and apparatuses by, among other things, utilizing an extrusion die having an elongate generally flat and thin slot in communication with a closure member channel wherethrough a plastic film is simultaneously extruded with integral closure members. Accordingly, the secondary step of separately extruding a closure member and joining the same to the plastic film is avoided and equipment for such secondary steps are not required.

The extruded plastic film and integral closure members are cooled by passing the same over a rotatably driven chill roll. An air knife is used for directing air against the extruded film and closure members and pushing the film against the chill roll. Nozzles are also be provided for directing air specifically towards the closure members for aiding in the cooling thereof. The temperatures of the chill roll and air being directed from the air knife and/or nozzles are selectively controlled for properly cooling the film and closure members.

So as to further cool the closure members, cooling shoes are provided and are placed in close proximity to the closure members and draw heat therefrom. In the case of a male closure member, the cooling shoe substantially surrounds the closure member. In the case of a female closure member, the cooling shoe may surround the closure member and may also be provided with an extension which is inserted within the groove of the female member, thereby separating the walls forming the female closure member and also drawing heat therefrom. The cooling shoe is located such that it draws heat from and causes the closure members to be solidified after the plastic film has already solidified and after the closure member forms a skin or generally solidifies on its outer surface thereof. The cooling shoe may be located adjacent the chill roll thereby sandwiching the closure members and film therebetween. In the alternative, a backup plate may be provided and the film and closure members may be sandwiched between the backup plate and cooling shoe as they pass therethrough.

After the film and closure members have been sufficiently cooled, a folding mechanism may be used for folding the plastic film and causing the male and female closure members to be interlocked prior to further processing the same into reclosable bags or placing on storage rolls for later processing.

In one form thereof, the present invention is directed to a method of manufacturing a plastic film for forming reclosable bags. The method includes simultaneously extruding through a unitary or contiguous die opening a thin, generally flat plastic film and an integral closure member and, thereafter, cooling the plastic film and integral closure member. The cooling is accomplished by passing the plastic film over a rotatably driven chill roll. The film is passed over the chill roll by first pushing the film against the chill roll by forcing air through an air knife onto the plastic film and toward the chill roll. Additional cooling is provided by placing a cooling shoe in close proximity to the closure member and drawing heat therefrom. Where the closure member is a male member, the cooling shoe generally surrounds the closure member and, where the closure member is a female closure member, an extension is inserted between the two upstanding walls of the female closure member and within the groove thereof thereby separating the two upstanding walls and drawing heat therefrom. The female closure member walls may also be surrounded for further cooling and for setting the same. Cooling by the cooling shoe is done after the plastic film substantially solidifies and after the closure member forms a skin and generally solidifies on the outside surface thereof. A backup plate may be provided and the plastic film sandwiched between the backup plate and the cooling shoe. A controlling means connected to the various components is provided for controlling the rate of extruding the plastic film and the integral closure members, the temperature of the molten plastic prior to extruding into a plastic film and closure members, the temperature of the cooling shoe, the speed of the chill roll and the temperature of the chill roll, and the temperature and velocity of the air forced through the air knife and nozzle.

In one form thereof, the present invention is directed to an apparatus for manufacturing a plastic film for forming reclosable bags. An extrusion die having an elongate, generally longitudinal thin slot in communication with or contiguous with a closure member channel is provided. Further, a cooling means is provided for cooling an extruded plastic film and integral closure member which is extruded from the die. The cooling means may be a rotatably driven chill roll having a longitudinal axis generally parallel to the thin slot and adapted for passing the plastic film and integral closure member thereover. A cooling shoe is also provided and placed in close proximity to the extruded integral closure member. The cooling shoe may include a generally longitudinal channel adapted for receiving the closure member therethrough. The cooling shoe may also include a longitudinal extension adapted to be received between two upstanding walls of a female closure member. A backup plate having a generally flat surface is provided and the extruded plastic film passes over the flat surface. The cooling shoe is located over the flat surface thereby sandwiching the plastic film between the backup plate flat surface and cooling shoe. An air knife is provided and situated generally longitudinally parallel to the chill roll and directs air toward the extruded plastic film. A nozzle is also provided for directing a stream of air towards the extruded integral closure member.

BRIEF DESCRIPTION OF THE DRAWINGS

The above-mentioned and other features and objects of this invention and the manner of obtaining them will become more apparent and the invention itself will be better understood by reference to the following description of the embodiments of the invention taken in conjunction with the accompanying drawings wherein:

FIG. 1 is a schematic elevational view showing an extrusion arrangement and the cooling of the extruded film according to the principles of the present invention;

FIG. 2 is a schematic elevational view of a different cooling shoe location of the extrusion arrangement of FIG. 1;

FIG. 3 is an elevational view showing the extrusion die face and opening of the extrusion arrangement of FIG. 1;

FIG. 4 is a generally schematic perspective view illustrating the extrusion of the film and the cooling of the closure members with cooling shoes according to the principles of the present invention; and, FIGS. 5-9 are cross-sectional elevational views of cooling shoe shapes and corresponding closure members.

Corresponding reference characters indicate corresponding parts throughout the several views of the drawings.

Figure 5:
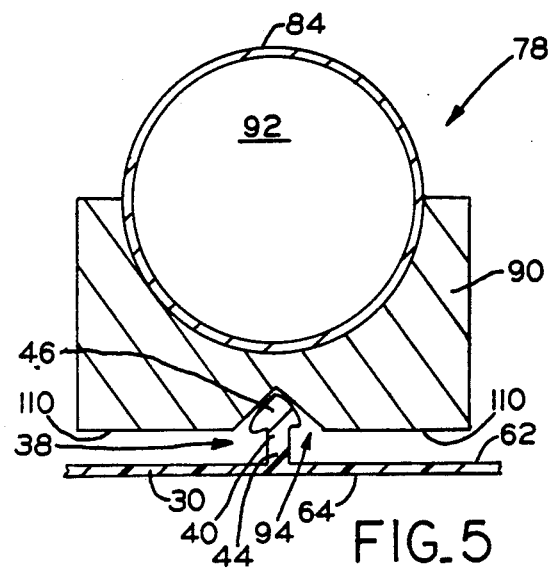

The exemplifications set out herein illustrate preferred embodiments of the invention in one form thereof and such exemplifications are not to be construed as limiting the scope of the disclosure or the scope of the invention in any manner.

DETAILED DESCRIPTION OF SPECIFIC EMBODIMENTS

As shown in the drawings, an apparatus, generally designated as 10, is provided for practicing the method of the present invention for manufacturing a plastic film with integral closure members for forming reclosable bags. Apparatus 10 includes an extruder 12 receiving plastic material 14 through hopper 16 as designated by arrow A. Extruder 12 includes a heating means (not shown) for heating plastic material 14 into a molten state and, also, includes an auger screw mechanism (not shown) for pushing the molten plastic material forwardly through conduit 18 and into an extrusion die or die block 20.

Extrusion die 20 includes an extrusion die face 22 whereat there is formed a die opening generally designated as 24. Molten plastic is forced through the extrusion die 20 and out of die opening 24. Preferably, face 22 is situated substantially horizontally so as to extrude the plastic film or web 26 generally vertically downwardly.

Die opening 24 includes an elongate generally flat or longitudinal slot 28 wherethrough the thin, generally flat plastic film portion 30 of plastic film 26 is extruded. Die opening 24 further includes closure member channels generally designated as 32 and which are in communication with or contiguous with elongate slot 28. Closure member channels 32 are shaped accordingly for extruding therefrom integral closure members 38 which interlock with one another and which may be used at an opening of a reclosable bag for selectively closing and opening the same. Closure member channels 32 communicate with and extend from one side of elongate slot 28 such that detached integral closure members 38 extend from one side of extended plastic film portion 30. More specifically, closure member channels 32 may be a male-shaped opening 34 or a female-shaped opening 36 for extruding therethrough respective male or rib closure member 40 or female closure member 42.

As shown in FIG. 3, male-shaped opening 34 is shaped quite similar to an arrow and having the base thereof in communication with elongate slot 28. Female-shaped opening 36 is generally horseshoe-shaped and having the bottom thereof being in communication with elongate slot 28. It is noted that various different shaped closure member channels 32 may be provided on extrusion die face 22 for extruding various shapes of closure members 38 and that the specific shapes of closure member channels 32 and extruded closure members 38, shown herein, are for exemplification purposes only.

As more clearly shown in FIG. 4, the integrally extruded male closure member 40 includes base portion 44 integrally connected to plastic film 30 and also includes an upper enlarged portion 46 and catch projections 48. The female closure member 42 includes two upstanding walls 50 forming a groove 52 therebetween. Each wall 50 has an inwardly turning edge 54 at its upper end thereof. The specific shapes of closure members 38 are also shown herein for exemplification purposes only and it is noted that various different shaped closure members may be employed and extruded. However, in general, the female closure member will include two upstanding walls forming a groove therebetween for receiving and holding the male member therein. Here, the catch projections 48 of male member 40 seat against inwardly turning edges 54 of female closure members 42, thus, causing the interlocking of male and female members 40 and 42.

As the extruded plastic film 26 exits extrusion die 20, the plastic film 30 and integral closure members 38 are caused to be cooled with a cooling means. As shown in FIGS. 1 and 2, a rotatably driven chill roll 56 is caused to rotate about its longitudinal axis in the direction of arrow B. The longitudinal axis of chill roll 56 is located generally parallel to slot 24 so that the extruded plastic film 26 may be evenly received or passed over the outer surface 58 of chill roll 56. Outer surface 58 has a mirror finish for enhancing the surface finish of film 26 and preventing plastic film 26 from sticking thereon. The temperature of chill roll 56 is selectively controlled and adapted for drawing heat from extruded film 26. A heat exchanger (not shown) is connected to chill roll 56 for selectively dissipating the heat collected by chill roll 56 and thereby retaining chill roll 56 at the selected temperature.

As plastic film 26 is extruded from die 20, it is pushed against chill roll 56 so that proper contact may be provided between film 26 and outer surface 58 of chill roll 56. It is advantageous to provide proper contact therebetween for more accurately and evenly drawing heat from film 26 and, thereafter, properly passing the plastic film 26 over the chill roll 56. In this regard, an air knife 60 is situated generally longitudinally parallel to chill roll 56 and is adapted for directing and forcing air therefrom and onto the plastic film 26 and towards chill roll 56 as generally indicated by arrow C. The air is directed onto the upper surface 62 of plastic film 26 thereby forcing lower surface 64 of film 26 against chill roll outer surface 58. The air knife also aids in the cooling of film 26 and, in this regard, the temperature of the air forced through air knife 60 is also selectively controlled by an air heat transfer unit (not shown).

So as to further aid in the cooling of the closure members 38, as shown in FIG. 1, nozzles 66 are provided for directing a stream of air towards the specific locations whereat the extruded integral closure members 38 are located. The temperature of the air being pushed through nozzles 66 is also selectively controlled so as to provide desired cooling to the closure members. In addition to controlling the temperature of the air directed through nozzles 66 and air knife 60, the velocity thereof is also selectively controlled thereby further controlling the cooling rate and force applied to the plastic film 30 and closure members 38 against chill roll 56.

The rotational velocity of chill roll 56 is selectively controlled and calibrated to correspond to the extrusion rate through die 20. In this regard, depending also on the selectively controlled temperature of the molten plastic material within die 20, extruded plastic film 26 may be selectively stretched thereby further shaping the same. More specifically, stretching of the plastic film 26 is accomplished by selectively controlling the rate of extruding the plastic film 26 from die 20 so as to be slower than the rotational velocity of chill roll 56.

After film 26 has been properly cooled and solidified, it may be directly formed into reclosable bags or stored for later use in forming reclosable bags. In FIGS. 1 and 2, plastic film 26 is passed over idler roll 68 and, thereafter, through a folding mechanism 70 for folding the plastic film 26 and joining the male and female closure members 40 and 42 to one another. Thereafter, the folded plastic film 72 is wound up for storage purposes on wind up roll 74 which is drivingly rotated in the direction indicated by arrow D. In later operations, the folded plastic film 72 is taken off of wind up roll 74 and reclosable bags are formed therewith.

So as to further aid in the cooling of closure members 38, the cooling means further includes a cooling shoe means or member 76 which is placed on the closure member side of plastic film 26 in close proximity to the extruded integral closure members 38 and draws heat from the closure members 38. The cooling shoe may be a unitary member extending across the entire length of the film 26 as shown in FIGS. 1 and 2 or, in the alternative and more preferably, individual shoe members 78 may be provided at specific locations across film 26. In addition, the cooling shoe may be located adjacent chill roll 56 as shown in FIG. 2 or, in the alternative, may be located adjacent a backing plate 80 at a location after the plastic film 26 has passed over chill roll 56 as shown in FIG. 1. Backing plate 80 may also be chilled for aiding in the cooling of film 26. It is noted that in FIG.

2, plastic film 26 is sandwiched between shoe 76 and chill roll surface 58 whereas in FIG. 2, plastic film 26 is shown sandwiched between shoe 76 and a generally flat surface 82 of backing plate 80. In both of these embodiments, shoe 76 is located adjacent upper surface 62 of film 26 while lower surface 64 of film 26 is adjacent either chill roll surface 58 or backing plate surface 82. Further, shoe 76 is selectively placed in close proximity to the closure members 38 by a means adopted to move the shoe 76 close to and away from plastic film 26.

As shown in FIG. 4, heat drawn by the cooling shoes 78 from the closure members 38 is dissipated via a cooling fluid traveling to and from the cooling shoes through pipes 84. The fluid may be circulated through pipes 84 and cooling shoes 76 via a pump 86 and, finally, the heat may be dissipated from the fluid through the use of a heat exchanger 88. Accordingly, the temperature of the cooling shoes is selectively controlled as needed.

So as to increase the heat transfer efficiency of the cooling shoes, in addition to placing the same in close proximity to the extruded integral closure members 38, they are given specific shapes corresponding to the shape of the extruded closure members 38. As shown in FIGS. 5-9 wherein various preferred shapes of cooling shoes 78 are shown in cross section, all of the cooling shoes include a means by which heat collected from the closure member 38 may be transferred away therefrom. More specifically, pipe 84 is imbedded in or in direct contact with a heat transfer body 90. Preferably, pipe 84 is made of a good heat conducting material, such as copper, brass, steel, etc., and includes an inner passageway 92 for passing a cooling fluid therethrough. Heat is, thus, ultimately transferred to the cooling fluid and, as discussed hereinabove, dissipated via heat exchanger 88. Each of the cooling shoes, therefore, forms a heat a head sink. Heat transfer body 90 is also made of a good heat conducting material, such as copper, brass, steel, etc., and is attached to and is in direct contact with pipe 84 for transferring heat thereto and to the cooling fluid. As shown in FIG. 7, pipes 84 may also be directly formed within heat transfer body 90 and exterior pipes 84 merely connected thereto for providing cooling fluid.

Figure 6:
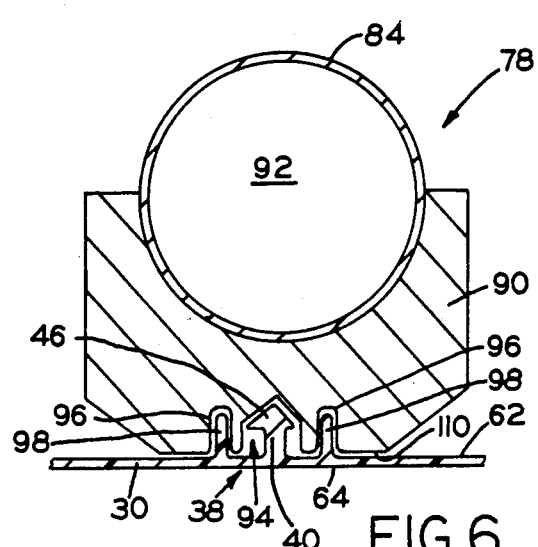
Figure 7:
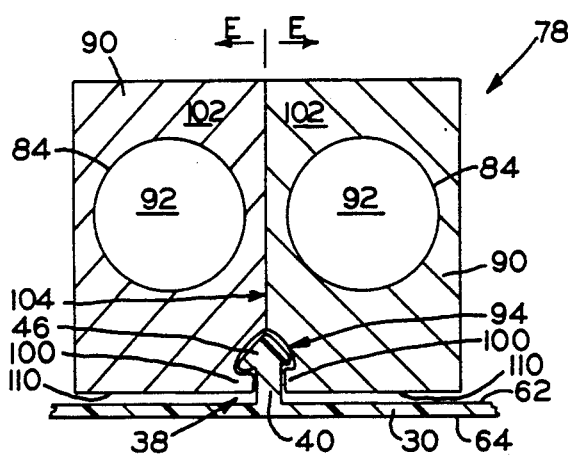

In FIGS. 5-7, there are shown cooling shoes adapted to draw heat from and cool male-shape closure members 38. These cooling shoes, in addition to being placed in close proximity to the extruded integral closure member 38, generally surround the closure member 38 for drawing heat therefrom. This is accomplished by providing a generally longitudinal channel generally designated as 94 adapted for receiving the closure member 38 therethrough. It is noted that when cooling shoe 76 is used adjacent chill roll 56, as shown in FIG. 2, its surface 110 adjacent chill roll 56 is curvilinear-shaped having the same radius as chill roll 56. Furthermore, in this embodiment, channel 94 is also correspondingly curvilinear and having the same radius as the chill roll 56.

In FIG. 5, longitudinal channel 94 is V-shaped and receives or surrounds only the upper portion 46 of male member 40.

In FIG. 6, longitudinal channel 94 is V-shaped at the bottom thereof, however, is as deep as the height of male member 40 thereby substantially surrounding the entire male member when cooling shoe 78 is placed in position as shown. The cooling shoe shown in FIG. 6 also includes two side channels 96 used for receiving therethrough shoulders 98 located on both sides of male member 40. Side channels 96 are as deep as shoulders 98 are tall and substantially receive therein and surround shoulders 98 for drawing heat therefrom and cooling the same.

In FIG. 7, longitudinal channel 94 more accurately surrounds and comes in closer proximity to male closure member 40 by including two edges 100 that protrude into channel 94. In this fashion, channel 94 more closely resembles the shape of male member 40 and places heat transfer body 90 more closely thereto for more efficiently drawing heat from male member 40. So as to place cooling shoe 78, shown in FIG. 7, in a cooling position as, for example, shown in FIG. 4, heat transfer body 90 is made of two separable parts 102 separated along plane 104. More specifically, parts 102 are separable along plane 104 by separating the same in the directions indicated by arrows E.

Figure 8:
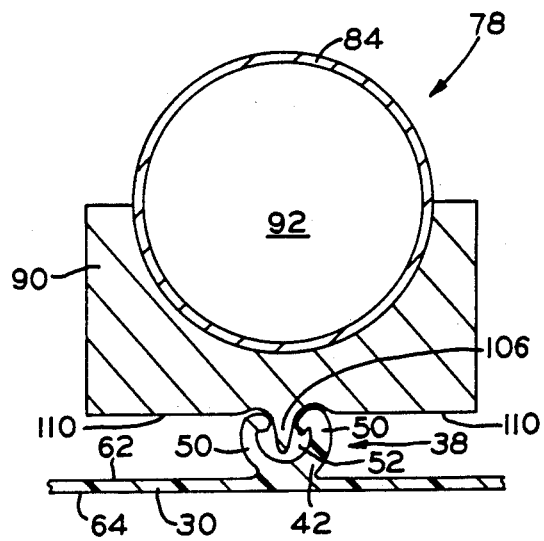
Figure 9:
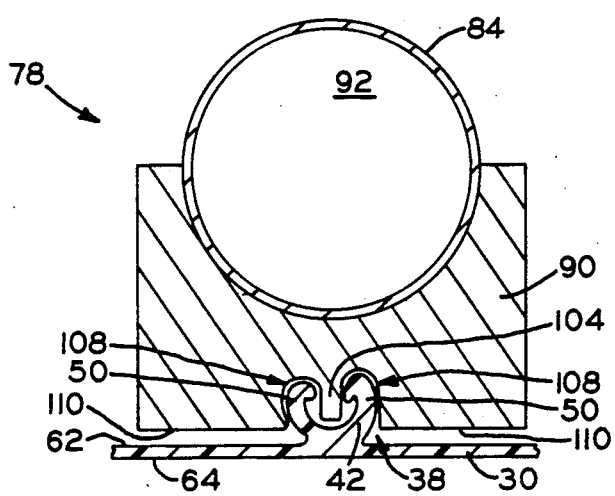

In FIGS. 8 and 9, there are shown cooling shoes 78 shaped for drawing heat from and cooling female members 42. In FIG. 8, heat transfer body 90 of cooling shoe 78 includes a longitudinal extension 106 which is adapted to be received between upstanding walls 50 of female closure member 42. In essence, extension 106 is inserted within groove 52 between walls 50 and causes walls 50 to be separated and draws heat therefrom.

In FIG. 9, in addition to longitudinal extension 104, there are formed longitudinal grooves 108 on both sides of extension 104 for receiving therein walls 50 of female closure member 42. In this fashion, upstanding walls 50 are substantially surrounded by heat transfer body 90 of cooling shoe 78 and the heat transferability thereof and efficiency are increased.

In operation, cooling shoe 76 is placed in close proximity to the plastic film 26 and closure members 38 substantially after the thin flat film 30 solidifies and after the particular closure member 38 forms a skin and generally solidifies on its outside surface. More specifically, after plastic film 26 is extruded, ambient air therearound being at a lower temperature than the plastic film 26 causes the same to start to solidify on the outside surfaces thereof. After film 26 is caused to come in contact with the chill roll outer surface 58 via lower surface 64, heat is first caused to be drawn away from flat film 30 thereby solidifying flat film 30 at a faster rate and prior to the solidification of closure members 38. Accordingly, the plastic film 30 is caused to solidify and form a flat and thin plastic film that may be used as the walls in the formation of reclosable bags.

The closure members 38 must also be chilled and solidified in substantially the same shape as that extruded and the deformation thereof must be avoided so that the closure members may interlock and operate as described hereinabove. Heat must be drawn away from the closure members 38 after extrusion so that they may be solidified and set in their proper shape. In this regard, the cooling shoes 78 are preferably located as close as possible to the extrusion die 20. However, it has been found that placing the cooling shoe to close to the extrusion die 20 does not set or solidify the closure members 38 properly and deformation is caused to both the closure members 38 and flat plastic film 30 by the cooling shoe. Rather, the preferred location of cooling shoe 76 is in line after flat film 30 has solidified and after a skin is formed on the outside surface of closure members 38. In this manner, film 30 is not caused to be deformed by any contact that may occur with the cooling shoe 76. Further, because a skin has formed on the exterior surface of closure member 38, it more readily slides through cooling shoe 76 not sticking thereto. The further cooling of closure member 38 by cooling shoe 76 causes the inside portion thereof, which was previously in a molten or moldable stage to be solidified and to be set by the cooling shoe.

It is also noted that immediately after closure members 38 are extruded, in addition to starting to form a skin they immediately start to deform from their original extruded shape. More specifically, the male closure member 40 may twist or fall to one side and the female closure member walls 50 tend to fall in on themselves into groove 52 thereof. In this regard, cooling shoes 76 reshape or push back into shape the respective closure member 38 while drawing heat therefrom and thereby setting the closure member in its proper position. More specifically, the male closure member 40 may be picked up from a leaning position and the female closure member walls 50 may be separated from one another and, thus, better defining groove 52.

While the invention has been described as having specific embodiments, it will be understood that it is capable of further modifications. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A method of manufacturing a plastic film for forming reclosable bags comprising the steps of:
   simultaneously extruding through a contiguous die opening, a thin generally flat plastic film and an integral closure member extending from one side of said plastic film; and,
   cooling said plastic film and integral closure member by placing a cooling shoe, which forms a heat sink and which conforms in shape to said closure member as originally extruded, in engagement with said closure member on the closure member side of said plastic film and drawing heat from said closure member.

2. The method of claim 1 wherein said step of placing said cooling shoe is done after the plastic film substantially solidifies and after said closure member forms a skin and generally solidifies on the outside thereof.

3. The method of claim 2 wherein said step of placing further comprises the step of providing a backup plate against said film said opposite said closure member and said cooling shoe.

4. The method of claim 2 further comprising the step of selectively controlling the rate of extruding said plastic film and integral close member, the temperature of said plastic film and closure member prior to the step of extruding, the temperature of said cooling shoe, the speed of the chill roll and the temperature of the chill roll.

5. The method of claim 2 wherein said integrally extruded closure member is a male member and said step of placing further comprises the step of generally surrounding said closure member and drawing heat therefrom.

6. The method of claim 2 wherein said integrally extruded closure member comprises a female closure member with two upstanding walls and said step of placing further comprises the step of inserting an extension of said cooling shoe between said two upstanding walls and separating said two upstanding walls and drawing heat therefrom.

7. The method of claim 2 wherein said step of placing further comprises a step of providing a backup plate against said film side opposite said closure member and said cooling shoe.

8. The method of claim 1 further comprising the step of selectively controlling the rate of extruding said plastic film and integral closure member, the temperature of said plastic film and closure member prior to the step of extruding, the temperature of said cooling shoe, the speed of the chill roll and the temperature of the chill roll.

9. The method of claim 1 wherein said integrally extruded closure member is a male member and said step of placing further comprises the step of generally surrounding said closure member and drawing heat therefrom.

10. The method of claim 1 wherein said integrally extruded closure member comprises a female closure member with two upstanding walls and said step of placing further comprises the step of inserting an extension of said cooling shoe between said two upstanding walls and separating said two upstanding walls and drawing heat therefrom.

11. The method of claim 10 wherein said step of placing further comprises the step of surrounding said upstanding walls with said cooling shoe.

12. The method of claim 1 wherein said step of extruding comprises extruding an integral male closure member and an integral female closure member and further comprising the step of folding said plastic film and joining said male and female closure members.

13. A method of manufacturing a plastic film for forming reclosable bags comprising the steps of:
   simultaneously extruding through a contiguous die opening, a thin plastic film and integral closure member extending from one side of said plastic film, and,
   cooling said plastic film and integral closure member by passing said plastic film over a rotatably driven chill roll and by placing a cooling shoe, which forms a heat sink and which conforms in shape to said closure member as originally extruded, in engagement with said closure member one the closure member side of said plastic film and drawing heat from said closure member.

14. The method of claim 13 wherein said step of cooling further comprises the step of pushing said plastic film against said chill roll.

15. The method of claim 13 wherein said step of placing the cooling shoe is done after the plastic film substantially solidifies and after said closure member forms a skin and generally solidifies on the outside thereof.

16. The method of claim 13 wherein said step of placing further comprises the step of providing a backup plate against said film side opposite said closure member and said cooling shoe.

17. The method of claim 13 further comprising the step of selectively controlling the rate of extruding said plastic film and integral closure member, the temperature of said plastic film and closure member prior to the step of extruding, the temperature of said cooling shoe, the speed of the chill roll and the temperature of the chill roll.

18. The method of claim 13 wherein said integrally extruded closure member is a male member and said step of placing further comprises the step of generally surrounding said closure member for drawing heat therefrom.

19. The method of claim 30 wherein said integrally extruded closure member comprises a female closure member with two upstanding walls and said step of placing further comprises the step of inserting an extension of said cooling shoe between said two upstanding walls for separating said two upstanding walls and drawing heat therefrom.

20. The method of claim 19 wherein said step of placing further comprises the step of surrounding said upstanding walls with said cooling shoe.

21. An apparatus for manufacturing a plastic film for forming reclosable bags comprising:
an extrusion die having an elongate generally longitudinal and thin slot contiguous with a closure member channel; and,
a cooling means for cooling an extruded plastic film and integral closure member extending from one side of said plastic film and extruded from said die, said cooling means comprising a rotatably driven chill roll having a longitudinal axis generally parallel to said thin slot adapted for passing the plastic film and integral closure member thereover, and a cooling shoe, which forms a heat sink and which, placed in engagement with the extruded integral closure member on the closure member side of said plastic film conforms in shape to said closure member as originally extruded.

22. The apparatus of claim 21 wherein said cooling shoe includes a generally longitudinal channel adapted for receiving said closure member therethrough.

23. The apparatus of claim 22 further comprising a longitudinal extension within said channel adapted to be received between two upstanding walls of a closure member.

24. The apparatus of claim 21 further comprising a longitudinal extension on said cooling shoe adapted to be received between two upstanding walls of a closure member.

25. The apparatus of claim 21 further comprising a backup plate having a generally flat surface, the extruded plastic film passing over said flat surface and said cooling shoe located over said flat surface thereby sandwiching the plastic film between said backup plate and cooling shoe.

26. The apparatus of claim 21 further comprising an air knife situated generally longitudinally parallel to said chill roll and directing air towards the extruded plastic film.

27. The apparatus of claim 21 further comprising a nozzle for directing a stream of air towards the extruded integral closure member.

28. an apparatus for manufacturing a plastic film for forming reclosable bags comprising:
an extrusion die having an elongate generally longitudinal and thin slot contiguous with a closure member channel; and,
a coling means for cooling an extruded plastic film and integral closure member extending from one side of said plastic film and extruded from said die, said cooling means including a cooling shoe, which forms a heat sink and which conforms in shape to said closure member as originally extruded, placed in engagement with the extruded integral closure member on the closure member side of said plastic film.

29. The apparatus of claim 28 wherein said cooling shoe includes a generally longitudinal channel adapted for receiving said closure member therethrough.

30. The apparatus of claim 29 further comprising a longitudinal extension within said channel adapted to be received between two upstanding walls of a closure member.

31. The apparatus of claim 28 further comprising a longitudinal extension on said cooling shoe adapted to be received between two upstanding walls of a closure member.

32. The apparatus of claim 28 further comprising a backup plate having a generally flat surface, the extruded plastic film passing over said flat surface and said cooling shoe located over said flat surface thereby sandwiching the plastic film between said backup plate and cooling shoe.

33. The apparatus of claim 28 further comprising a nozzle for directing a stream of air towards the extruded integral closure member.

34. The apparatus of claim 28 further comprising a control means for controlling the rate of extruding the plastic film and integral closure member through said extrusion die slot and closure member channel, the temperature of the plastic film within the extrusion die, the speed of the chill roll and the temperature of the chill roll and the temperature of said cooling shoe.

* * * * *

UNITED STATES PATENT AND TRADEMARK OFFICE
CERTIFICATE OF CORRECTION

PATENT NO. : 5,053,091

DATED : October 1, 1991

INVENTOR(S) : Kenneth J. Giljam et al.

It is certified that error appears in the above-identified patent and that said Letters Patent is hereby corrected as shown below:

Column 7, lines 36-37, delete "a head".

Column 5, line 15, change "detached" to --extruded--.

Column 5, line 16, change "extended" to --extruded--.

Column 10, line 3, change "2" to --1--.
        line 45, change "one" to --on--.

Column 11, line 3, change "30" to --13--.

Column 12, line 6, change "an" to --An--.
        line 11, change "coling" to --cooling--.

Signed and Sealed this

Sixth Day of April, 1993

Attest:

STEPHEN G. KUNIN

Attesting Officer      Acting Commissioner of Patents and Trademarks